July 8, 1941.　　　　J. C. HEINTZ　　　　2,248,499
BELT SPLICE VULCANIZER
Filed Sept. 7, 1937
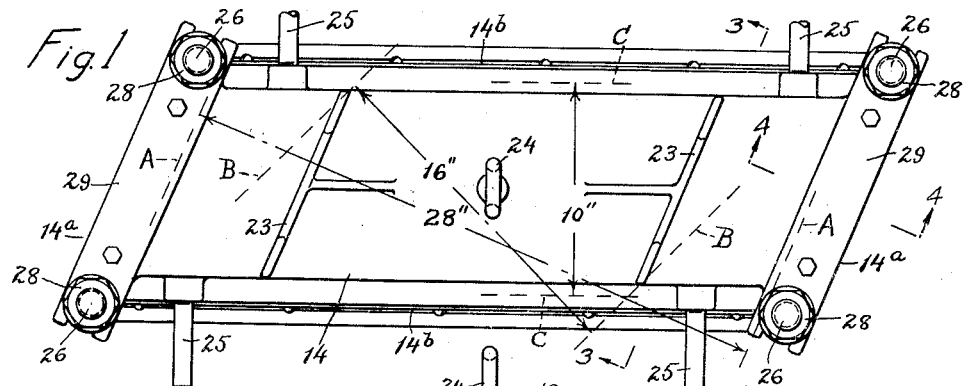
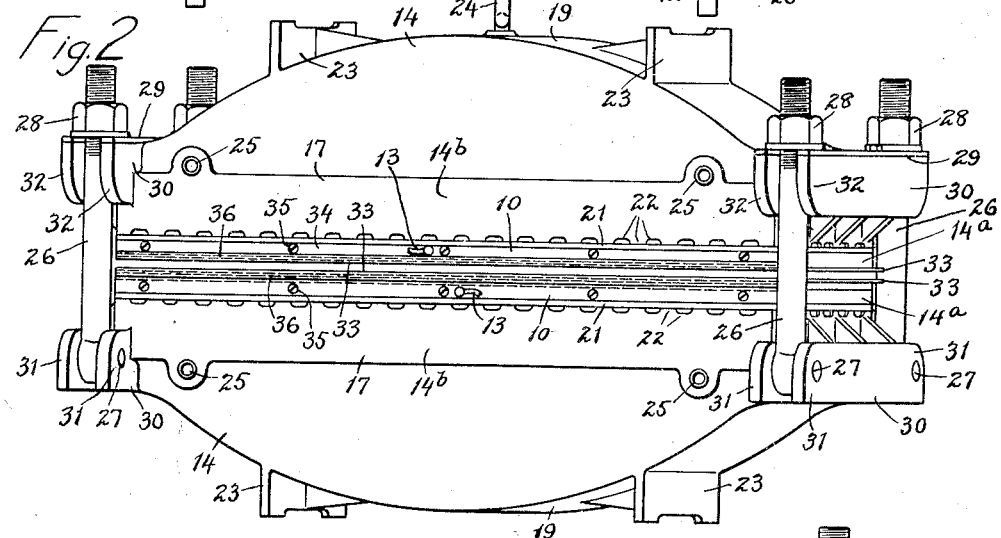
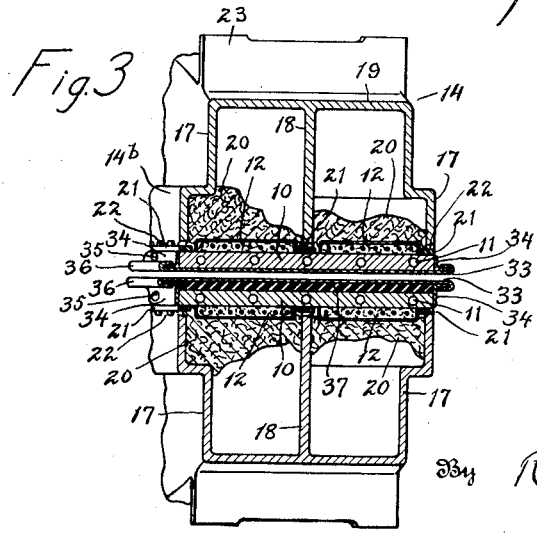
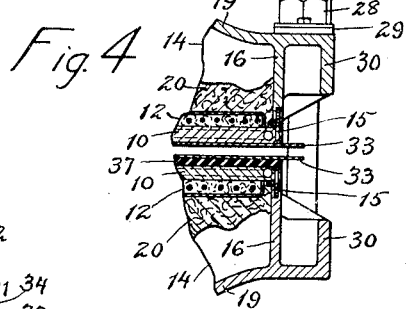
Inventor,
J. C. Heintz
By Robert M. Pierson
Attorney Patented July 8, 1941

2,248,499

UNITED STATES PATENT OFFICE 2,248,499

BELT SPLICE VULCANIZER

James C. Heintz, Lakewood, Ohio

Application September 7, 1937, Serial No. 162,599

9 Claims. (Cl. 18—17)

This invention relates to apparatus for vulcanizing splices and other repairs in flat rubber belts. An example of such apparatus, consisting mainly of a pair of rectangular platens having electrical or other heating means and separably clamped upon the belt by a pair of frames or press heads in heat insulated relation to the platens, is disclosed in my prior Patent No. 1,949,275 of Feb. 27, 1934.

The principal object of my invention is to provide a belt vulcanizer of the class disclosed in my aforesaid patent, adapted for curing diagonal splices and of an inherently lighter and hence more portable and easily manipulated, less costly construction, quicker operating, and involving a lower heat consumption for any given duty. This object is attained without increasing the dimension of the vulcanizer transversely of the belts and decreasing its dimension longitudinally thereof by placing the transverse edges diagonally of the longitudinal edges and thus omitting nearly half of the mass of a rectangular vulcanizer for the same duty.

A further object in connection with belt vulcanizers of the general type mentioned, as well as the particular improved diagonal kind, is to provide improved means for tapering off the cure to avoid ridges in the rubber at the margins of a splice or repair, and an improved cushioning means to accommodate seams or other portions of increased thickness in the splice or the repair.

Of the accompanying drawing, Fig. 1 is a top plan view of a belt vulcanizer embodying my invention.

Fig. 2 is a front elevation showing the press-head platens separated by the thickness of a belt.

Fig. 3 is a longitudinal section on the line 3—3 of Fig. 1.

Fig. 4 is a partial cross section on the line 4—4 of Fig. 1.

In the drawing, 10, 10 are a pair of comparatively thin, flat-faced vulcanizing platens, preferably formed of an aluminum alloy for lightness and high heat conductivity, and each having cast therein a sinuous pipe or conduit 11, for circulating water to cool the platens and the work after a cure and permit the press to be opened without causing the repair to blow or blister. While any suitable heating medium could be used, I prefer to associate with the back of each platen a number of electrical heating units 12 disposed, for example, in two transverse rows on each platen, and each comprising a heating element embedded in insulating material and confined against the platen by a sheet-metal casing. On each platen, one terminal 13 of a series of heating elements is shown in Fig. 2 at the edge of the platen, and suitable automatic heat regulators as well as connectors or plugs (not shown) for connection to an external circuit or circuits, may be provided.

14, 14 are a pair of hollow press heads or frames, preferably made of cast iron or steel, to provide greater strength and lower heat conductivity than the platens 10, attached to the respective platens by any suitable means, such as the screws 15 shown in Fig. 4. Each of these comprises longitudinal vertical webs, such as 16, along the short sides and at intermediate points, transverse vertical and horizontal outside webs 17 of an offset form, intermediate transverse vertical webs 18, and an arched back or cover wall 19, which in this case is integral with the vertical webs. The interior chambers of the press heads 14, adjacent to the platens 10 and heating elements 12, are filled with heat insulating material 20, such as loose asbestos. Backward heat conduction from the platens to the press heads is further reduced by means of strips 21 of suitable heat insulating composition, combined into a pair of skeleton gaskets, placed between the platens 10 and the edges of the frame webs, which latter are serrated as indicated at 22, to reduce the areas of contact. The backs of the heads are further formed with external stiffening ribs or webs 23, which may act as supporting legs when the head is inverted, and the upper one is provided with a ring 24 for the hook of a lifting tackle. Each head is further provided with four longitudinally projecting handles 25 whereby two men may manually transport the head.

The clamping pressure is applied to the heads 14 to draw them and the platens 10 together against the interposed work by means of clamping bolts 26 whose stems are pivotally connected to the lower platen by pins 27, and the nuts 28 on their upper screw-threaded ends are adapted to bear against a pair of hardened steel wear plates 29. These bolts coact with integral stiffening flanges 30 formed along the short edges of the respective platens and including spaced ears 31 and 32 to permit the swinging of the bolts into and out of clamping position. When the vulcanizer is intended to accommodate belts extending both the long way and the short way thereof, there may be four only of the clamping bolts 26, located at the four corners as illustrated, and externally of all working face outlines of the heads 14, so that said bolts may exert a maximum clamping pressure upon the platens 10 and therethrough upon the work; but one or more extra bolts could be placed along the short sides, when belts are not intended to extend through said sides, as illustrated in my aforesaid patent. In Figs. 1 and 2, the short sides of the vulcanizer are designated 14a and the long sides 14b.

In accordance with my present invention, the parallel longitudinal or shorter sides 14a and the parallel transverse or longer sides 14b of the vulcanizer are placed diagonally of each other to form a rhomboidal figure in plan, and the width of the clear belt receiving space between the short sides, measured on a line perpendicular to said sides, is such as to accommodate the widest belt for which the apparatus is adapted, which may, for example, be a 28" conveyor belt whose side edges A, A are shown in broken lines in Fig. 1, extending parallel to said short sides. Since it is customary, in making a splice on these wide conveyor belts, to step back the edges of the fabric body plies of the belt at an angle of 67½° to the longitudinal edges—such a splice being commonly designated by the complemental angle, as a 22½° splice—the longitudinal or short edges 14a of the vulcanizer are preferably placed at an angle of 22½° to the transverse or longer edges 14b, so that no space will be wasted in accommodating this widest belt. The vulcanizer could obviously be made for still wider belts if necessary. For a narrower transmission belt, such as one of 16" width where the plies are commonly stepped back with their edges at an angle of 45° in preparing to make a splice, the belt may be placed slantingly of the vulcanizer, as shown by its longitudinal edges B, B, indicated in broken lines in Fig. 1, so that the transverse edges of the splice will lie substantially parallel with the longer or transverse edges 14b of the vulcanizer. For transmission belts 10" or less in width, the edges C, C of the belt may be placed parallel with the long sides 14b, so that the belt will extend through the shorter sides 14a of the apparatus. The width dimensions 10", 16" and 28" of these respective belts are shown in Fig. 1.

The described diagonal or rhomboidal relation of the sides of this belt vulcanizer effects a saving of almost one-half of the material in the apparatus as compared with a rectangular vulcanizer of equal capacity, such as that described in my aforesaid earlier patent, with a corresponding saving in cost, weight and heat consumption, greater portability, quicker and easier manipulation, quicker heating up before and quicker cooling after a cure, for with the customary diagonal splicing, that part of a rectangular vulcanizer which is not over the splice is idle or wasted, and the same number of successive steps or placings on the belt to cover the entire splice is required in either case. Because relatively more of the platen area is effective in splice pressing, the unit pressure applied by the bolts 26 does not have to be as great for a given compression.

As an improved means for tapering off the curing heat to avoid ridge marking of the belt at the edges of a splice, and also to provide protection against scarring of the relatively soft aluminum metal of the platens 10, I cover the working face of each platen with a thin protector 33 of harder metal such as sheet steel, extended as a flange beyond the platen on all four edges and held in place by a pair of angle bars 34 attached by screws 35 to the longer edges of the platens, the horizontal flanges of said bars being in interlocking engagement with grooved or folded marginal portions 36 of said protector plates 33.

As an additional expedient for cushioning the work on its lower side, to accommodate and assist in levelling out seams or other high spots in the splice or repair, I locate a pad 37 of soft vulcanized rubber between the lower platen 10 and its protector plate 33, and confine it against the platen by means of said protector plate. Said lower plate 33 must be locally flexible to permit such functioning of the pad.

I claim:

1. A belt-splice vulcanizer comprising a pair of press heads, associated platens made of a highly heat-conductive light metal, adapted to receive between them a portion of a belt longer than the vulcanizer and having a pair of relatively long edges to extend transversely of the belt and a connecting pair of relatively short edges, and work-contacting, vulcanizing, protective covers having corresponding long and short edges, mounted against and between the platens, made of sheet metal of lower heat conductivity, and projecting beyond the platen edges to taper off the vulcanizing effect.

2. A vulcanizer according to claim 1 having the two longer edges of the covers folded over to form flange-receiving grooves, and angle bars having vertical flanges detachably secured to the longer edge faces of the platens and horizontal flanges fitted in said grooves.

3. A belt-splice vulcanizer comprising a pair of separable press heads, heating platens associated therewith, and detachable metallic covers for the platens, having heat-dissipating marginal portions projecting beyond the edges of the latter.

4. A belt-splice vulcanizer comprising a pair of press heads, associated heating platens made of metal having relatively high heat conductivity, and work-contacting, vulcanizing, protective covers, mounted against and between the platens, made of metal having lower heat conductivity, and projecting beyond the platen edges to taper off the vulcanizing effect.

5. The combination of a heater platen for a belt-splice vulcanizer, a single, relatively thin and locally flexible, metallic vulcanizing plate covering the whole area of said platen, and a cushion pad between the platen and cover.

6. A belt-splice vulcanizer comprising a pair of press heads, associated heater platens made of highly heat-conductive metal, a pair of work-contacting, vulcanizing, protective platen covers made of metal of lower heat conductivity, associated with the respective platens and projecting beyond their edges to taper off the vulcanizing effect, at least one of said covers being locally flexible, and a cushion pad between said flexible cover and its platen.

7. A belt-splice vulcanizer comprising a pair of separable press heads, heating platens associated therewith, and detachable metallic covers for the platens, having heat-dissipating marginal portions projecting beyond the edges of the latter, the press heads being substantially rhomboidal in plan form.

8. A belt-splice vulcanizer comprising a pair of separable press heads, heating platens associated therewith, and detachable metallic covers for the platens, having heat-dissipating marginal portions projecting beyond the edges of the latter, the press heads being substantially rhomboidal in plan form and having relatively short longitudinal and long transverse sides.

9. A belt-splice vulcanizer comprising a pair of separable press heads, heating platens associated therewith, and detachable metallic covers for the platens, having heat-dissipating marginal portions projecting beyond the edges of the latter, the press heads being substantially rhomboidal in plan form and having relatively short longitudinal and long transverse sides and being provided with clamping bolts at the four corners only, for admitting belts thru both the long and the short sides.

JAMES C. HEINTZ.